3,090,821
PREPARATION OF VISCOUS POLYMERS
Sterling E. Voltz, Brookhaven, Pa., assignor to Sun Oil Company, Philadelphia, Pa., a corporation of New Jersey
No Drawing. Filed Apr. 6, 1959, Ser. No. 804,109
2 Claims. (Cl. 260—683.15)

This invention relates to the preparation of viscous polymers and more particularly concerns a process for polymerizing alpha-monoolefin hydrocarbons having three or more carbon atoms per molecule to form viscous oily polymers which have utility as additives for other oils or as lubricants per se.

In the polymerization of alpha-monoolefins which have four or more carbon atoms per molecule, those in which there is a substituent at the beta position generally are more easily polymerized than straight chain monoolefins or than those which have one or more substituents located other than at the beta position. The present invention is directed to the catalytic polymerization of the more difficultly polymerizable alpha-monoolefins, i.e. those which do not have a substituent at the beta position, for the purpose of producing viscous oily products.

According to the invention, alpha-monoolefins having the formula

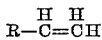

wherein R is an alkyl radical having 2–8 carbon atoms, are polymerized by contacting with a dispersion in an inert organic liquid medium of a tin tetrahalide in combination with an alkyl aluminum halide compound which can be a monohalide, a sesquihalide or a dihalide. In addition to the foregoing catalytic components an aluminum trialkyl can, if desired, also be present in the reaction mixture. It has now been found that such dispersions are highly effective catalytic systems for polymerizing the specified monoolefins, or mixtures thereof, to viscous oily products.

In preparing the catalyst system of the present invention a tin tetrahalide, such as $SnCl_4$, $SnF_4$, $SnBr_4$ or $SnI_4$, is dispersed in anhydrous form in an organic liquid reaction medium and an aluminum halide compound, e.g. $(C_2H_5)_2AlCl$, $(C_2H_5)_{1.5}AlCl_{1.5}$, $C_2H_5AlCl_2$ or their homologues and analogues, is added thereto. Any organic liquid which will be inert under the reaction conditions can be used. Preferably, hydrocarbon liquids are employed, for example, hexanes, heptanes, octanes, cyclopentanes, cyclohexanes, benzene, toluene, xylenes, decalin and the like. Nonterminal olefins which will not react under the conditions employed during the reaction can also be used.

The aluminum halide compound employed in the foregoing catalyst system can be an alkyl aluminum monohalide, sesquihalide or dihalide in which the alkyl group or groups contain 1–10 carbon atoms. A preferred compound is ethyl aluminum dichloride; however, its fluorine, bromine or iodine analogues can be used with good results. Other alkyl radicals can be substituted for the ethyl group or groups, for example, methyl, propyl, isobutyl, isooctyl or decyl radicals. An aluminum trialkyl cannot be substituted for the aluminum halide compound specified above, as otherwise substantially no catalytic activity for promoting polymerization will result.

The polymerization reaction is carried out by contacting the above-described catalyst system with the monomeric olefin which can be introduced into the reaction vessel in either vapor or liquid form. The temperature of the system generally should be above 0° C. and may be as high as 150° C. or even higher. As a general rule the rate of polymerization increases as the reaction temperature is increased. The reaction can be conducted under atmospheric pressure if the boiling point of the reaction medium is above the reaction temperature employed, or an elevated pressure can be employed when the reaction temperature is above the normal boiling point of the reaction medium. If the monomeric olefin charge is a normally gaseous olefin, it is advantageous to maintain an elevated pressure in the reactor since this increases the concentration of dissolved olefin in the reaction mixture and results in an increase in reaction rate. During the course of the reaction it is desirable to stir the reaction mixture continuously in order to effect efficient contact between the reactant and the catalyst.

In preparing the reaction mixture the proportions of components can be varied widely, and the rate of reaction will depend to an extent on the proportions selected. As a general rule, it is desirable to use a volume ratio of the charge olefin to reaction medium in the range of 0.2 to 5 on a liquid basis. It is also desirable that the molar ratio of the tin tetrahalide to the charge olefin be in the range of 0.0001 to 0.05 and more preferably 0.001 to 0.01, and that the molar ratio of the aluminum halide compound to the tin tetrahalide be in the range of 0.1 to 10 and more preferably 0.2 to 5. The reaction temperature selected will depend to an extent upon the particular olefin to be polymerized but generally will be in the range of 0° to 150° C. and more preferably 50° to 100° C.

The above-described procedure results in the formation of viscous oily polymers which may or may not remain dissolved in the reaction medium depending upon the reaction conditions and the particular monomer used. Upon completing the reaction a polar compound such as methanol is added to the reaction medium to deactivate the catalyst system. The oily polymer product can be separated from the catalyst and reaction medium by filtration, extraction and/or distillation. The resulting product can be utilized as a lubricant or can be used to thicken other oils and improve viscosity index. It can also be blended with other materials, for example, petroleum wax, to impart desirable characteristics. The products of the invention can, if desired, be hydrogenated before final use in order to eliminate terminal unsaturation.

The following example illustrates the invention more specifically:

*Example*

An inert reaction medium consisting of n-heptane was charged to a reaction vessel and anhydrous $SnCl_4$ was added thereto in a molar proportion of one part to 100 parts of the hereinafter specified olefin monomer. Ethyl aluminum dichloride was added to the mixture in a molar proportion to the $SnCl_4$ of 3:1. The mixture was heated while being stirred until a temperature of 50° C. was reached. The charge olefin, 4-methylpentene-1, was then added in a volume amount equivalent to the n-heptane and the mixture was stirred for 24 hours with the temperature being maintained at about 50° C. Methanol was then added, the mixture was filtered to separate the catalyst and the filtrate was distilled to remove the n-heptane and methanol. A viscous oily product was obtained in a yield of roughly 40% by weight based on the 4-methylpentene-1 charged to the system.

A higher yield of viscous polymer product can be obtained by operating in the above manner but employing a higher reaction temperature, e.g. by employing a temperature of 100° C. while maintaining the system under pressure.

Results which are generally similar to those above described are obtained when other tin tetrahalides are substituted for the tetrachloride or when alkyl aluminum monohalides or sesquihalides are substituted for the dihalide. By way of contrast, when triethyl aluminum is used in combination with a tin tetrahalide without any alkyl aluminum halide being present, only a trace of polymerization product is obtained.

The polymerization of other alpha-olefins having 4–10 carbon atoms and which do not have any substituent in the beta position can be carried out in the manner above described with substantially similar results. For example, alpha-olefins such as butene-1, 3-methylbutene-1, 3-ethylbutene-1, pentene-1, hexene-1, 4-methylpentene-1, 3,4-dimethylpentene-1, octene-1, vinylcyclohexane, 4,4-dimethylpentene-1, decene-1 and 5-ethyl-4,4-dimethylhexene-1 can be polymerized in accordance with the invention to yield viscous oily polymers.

I claim:

1. Polymerization method for forming viscous polymers which comprises contacting 4-methylpentene-1, under polymerizing conditions including a temperature in the range of 0–150° C., with a dispersion in an inert organic liquid medium of a tin tetrahalide in combination with an alkyl aluminum halide compound selected from the group consisting of monohalides, sesquihalides and dihalides, the molar ratio of alkyl aluminum halide to tin tetrahalide being in the range of 0.1 to 10.

2. Method according to claim 1 wherein the alkyl aluminum dihalide is ethyl aluminum dichloride.

References Cited in the file of this patent

UNITED STATES PATENTS

| | | |
|---|---|---|
| 2,085,535 | Langedijk et al. | June 29, 1937 |
| 2,181,640 | Deanesly et al. | Nov. 28, 1939 |
| 2,220,930 | Kraus | Nov. 12, 1940 |
| 2,786,035 | Friemiller et al. | Mar. 19, 1957 |
| 2,898,330 | Isbenjian | Aug. 4, 1959 |
| 2,908,674 | Nowlin et al. | Oct. 13, 1959 |
| 2,918,507 | Kennedy et al. | Dec. 22, 1959 |
| 2,935,542 | Minckler et al. | May 3, 1960 |